Dec. 1, 1959     E. N. GOMBERG     2,915,349
PISTON RING
Filed Aug. 12, 1958
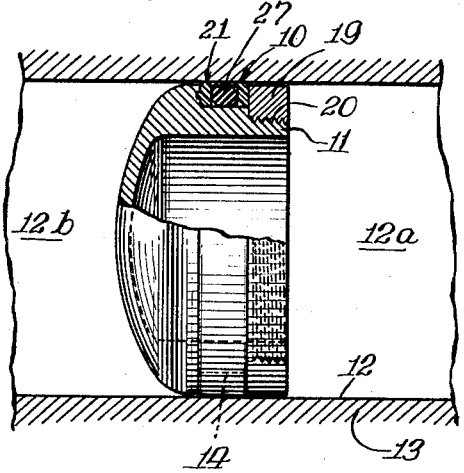
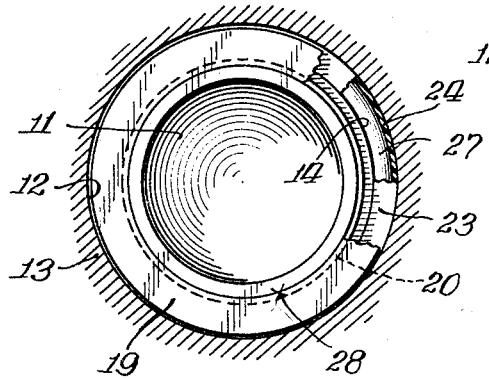
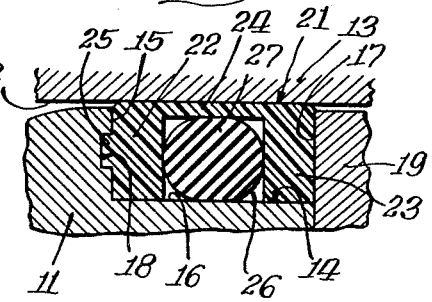
INVENTOR.
Edward N. Gomberg
BY
Schroeder, Hofgren, Brady & Wegner
Atty's.

United States Patent Office

2,915,349
Patented Dec. 1, 1959

2,915,349

PISTON RING

Edward N. Gomberg, Encino, Calif., assignor to Sundstrand Corporation, a corporation of Illinois Application August 12, 1958, Serial No. 754,554

8 Claims. (Cl. 309—23)

This invention relates to dynamic sealing means and in particular to piston rings.

In certain fluid handling systems, chemically inert sealing means capable of functioning at high temperatures are necessary. For example, such sealing means are required where the fluid is corrosive and would be injurious to conventional sealing means materials, such as rubber. Alternatively, chemically inert sealing means are required where contamination of the fluid by the sealing means material must be precluded.

While chemically inert, thermally stable materials such as Teflon (tetrafluoroethylene polymer) are available, a problem arises in the use of such materials in such sealing means as these materials have been found to lack the resiliency necessary to provide a proper seal.

One object of the instant invention is the provision of a new and improved seal.

Another object is the provision of such a seal comprising piston ring means.

A further object is the provision of such a seal including an inert sealing element, and resilient means for urging the element into proper sealing engagement with the members to be sealed.

A yet further object is to provide such a seal wherein the sealing element is arranged in a new and improved manner to protect the resilient member from contact with the fluid being controlled.

Still another object is to provide such a seal including a seal element formed of an inert material and having a U-shaped transverse cross-section received in a groove of one of the members to be sealed, with the leg portions of the seal element extending toward the groove bottom and the transverse portion thereof extending outwardly of the groove to contact the other of the members to be sealed, and a resilient member in the portion of the groove bounded by the seal element and the groove bottom resiliently urging the leg portions of the seal element apart and into sealing engagement with the groove sidewalls and urging the transverse portion of the seal element outwardly and into sealing engagement with the other member.

Further objects and advantages will become apparent from the following detailed description taken in connection with the accompanying drawings, in which:

Fig. 1 is a side elevation, with a portion shown in diametric section, of a piston provided with a seal means embodying the invention, installed in a cylinder bore, the means defining the cylinder bore being shown fragmentarily in diametric section;

Fig. 2 is an end elevation thereof, looking from the right of Fig. 1, with portions of the piston means and seal broken away; and Fig. 3 is an enlarged, diametric section of a portion thereof.

While this invention is susceptible of embodiments in many different forms, there is shown in the drawings and will herein be described in detail several embodiments of the invention with the understanding that the present disclosure is to be considered as an exemplification of the principles of the invention and is not intended to limit the invention to the embodiments illustrated. The scope of the invention will be pointed out in the appended claims.

The invention comprehends a sealing means for precluding fluid flow through a space between a pair of confronting wall surfaces, wherein a portion of the sealing means is protected by another portion of the sealing means from contact with the fluid being controlled. In the exemplary embodiment of the invention, the sealing means, generally designated 10, comprises a piston ring means mounted on a piston 11. Piston 11 is movable through a bore 12 defined by a piston cylinder 13. Piston 11 is movable through bore 12 by means such as applying a positive pressure to portion 12a of the bore on one side of piston 11, whereby the piston is moved through the bore to force fluid in the opposite portion 12b of the bore outwardly therefrom as desired.

More specifically, piston 11 comprises a rigid cup shaped member having a radially outwardly opening groove 14 defined by a first side wall 15, a bottom wall 16, and a second side wall 17. First side wall 15 is provided with a concentric, annular slot 18. Second side wall 17 is defined by a ring 19 removably secured to an exteriorly threaded portion 20 at the open end of the piston 11.

Sealing ring means 10 comprises an annular seal member 21 formed of an inert material, such as Teflon (tetrafluoroethylene polymer). The seal member has a U-shaped transverse cross section, as best seen in Fig. 3, and is disposed in groove 14 with its leg portions 22 and 23 extending toward groove bottom 16 and its transverse portion 24 extending outwardly of groove 14 and into contact with the confronting wall surface defining piston cylinder bore 12. Preferably, the leg portions 22 and 23 of the seal member are relatively thick and the transverse portion 24 is relatively thin. Illustratively, the leg portions may be .09 to .10 inches thick and the transverse portion may be .005 to .01 inches thick. As best seen in Fig. 3, leg portion 22 is provided with a concentric annular rib 25 complementary to and received in slot 18.

Within the space 26 in groove 14 defined by transverse portion 24, legs 22 and 23 and groove bottom 16, is concentrically disposed an elastic rubber O-ring 27. The cross-sectional diameter of O-ring 27 is preferably slightly larger than the spacing between seal transverse portion 24 and groove bottom 16 and between leg portions 22 and 23, whereby the O-ring is compressively received in space 26 resiliently to urge the transverse portion 24 into proper sealing engagement with bore wall surface 12 and urge leg portions 22 and 23 into sealing engagement with groove side walls 15 and 17.

By virtue of the thin diaphragm-like structure of transverse portion 24, the transverse portion is readily deformable by the resilient urging action of the O-ring to accommodate itself to irregularities in the concentricity of the wall of bore 12 and provide an improved dynamic sealing means. The relatively thick leg portions 22 and 23 provide proper support of the thin transverse portion. In addition, leg portion 22 provides an improved seal between bore portion 12b and space 26. As best seen in Fig. 3, the resilient urging of O-ring 27 against leg portion 22 is directed substantially directly toward rib 25 thereby effecting improved sealing engagement of the rib with the piston in slot 18, effectively positively preventing communication therebetween, and thereby, precluding deterioration of the O-ring by a corrosive fluid in bore portion 12b or precluding contamination of a fluid in bore portion 12b by the O-ring.

To install sealing ring means 10 on piston 11, O-ring 27 is placed in the seal member 21 and the assembled O-ring and seal member are moved concentrically over groove bottom 15 until leg 22 abuts groove side wall 15 and rib 25 is fully inserted into slot 18. Ring 19 is then fully threaded on piston end 20 to define the second side wall 17 of the groove. To preclude inadvertent loosening of ring 19, the ring may be staked, as at 28, to the piston. The assembled piston and sealing ring means is then installed in bore 12 of the piston cylinder 13, whereupon O-ring 27 effects the above described urging of the sealing portion 24 into sealing engagement with the piston cylinder, and urging of the leg portions 22 and 23 into sealing engagement with the piston groove side walls.

I claim:

1. Means for precluding fluid flow through a space between a pair of confronting wall surfaces, comprising: means in one of the wall surfaces defining a groove opening toward the other of the wall surfaces and having bottom and side walls; an elongated seal member of U-shaped transverse cross section disposed in said groove with its leg portions extending toward the groove bottom and its transverse portion extending outwardly of the groove to contact said other of the wall surfaces; and resilient means in the portion of said groove bounded by the seal member and the groove bottom and spaced from one of said groove side walls by said leg portion, said means in the groove urging said leg portions apart and into sealing engagement with the groove side walls and urging said transverse portion outwardly and into sealing engagement with said other of said wall surfaces.

2. The means for precluding fluid flow, of claim 1, wherein said transverse portion of the seal member comprises a flexible diaphragm.

3. The means for precluding fluid flow, of claim 2, wherein said transverse portion is substantially thinner than said leg portions of the seal member.

4. Means for precluding fluid flow through a space between a pair of confronting wall surfaces, comprising: means in one of the wall surfaces defining a groove opening toward the other of the wall surfaces and having bottom and side walls; an elongated seal member having a leg portion disposed in said groove and extending toward the groove bottom and a transverse portion extending outwardly of the groove to contact said other of the wall surfaces; and means in said groove between the transverse portion of the seal member and the groove bottom and spaced from one of said groove side walls by said leg portion, said means in the groove urging said leg portion into sealing engagement with one of said groove side walls and urging said transverse portion outwardly and into sealing engagement with said other of said wall surfaces.

5. Means for precluding fluid flow through a space between a pair of confronting wall surfaces, comprising: means in one of the wall surfaces defining a groove opening toward the other of the wall surfaces and having bottom and side walls; an elongated seal member having a leg portion disposed in said groove and extending toward the groove bottom and a transverse portion extending outwardly of the groove to contact said other of the wall surfaces; and means in said groove between the transverse portion of the seal member and the groove bottom, urging said leg portion into sealing engagement with one of said groove side walls and urging said transverse portion outwardly and into sealing engagement with said other of said wall surfaces, one of said one groove side wall and said leg portion of the seal member being provided with a slot extending parallel to the groove, and the other of said one groove side wall and said leg portion of the seal member being provided with a rib complementary to and received in said slot.

6. Means for precluding fluid flow through a space between a pair of confronting wall surfaces, comprising: means in one of the wall surfaces defining a groove opening toward the other of the wall surfaces and having bottom and side walls; an elongated seal member having a leg portion disposed in said groove and extending toward the groove bottom and a transverse portion extending outwardly of the groove to contact said other of the wall surfaces; and means in said groove between the transverse portion of the seal member and the groove bottom, urging said leg portion into sealing engagement with one of said groove side walls and urging said transverse portion outwardly and into sealing engagement with said other of said wall surfaces, one of said one groove side wall and said leg portion of the seal member being provided with a slot extending parallel to the groove, and the other of said one groove side wall and said leg portion of the seal member being provided with a rib complementary to and received in said slot, said means in the groove being arranged so that the urging action thereof against said leg portion is effectively maximized at said rib and slot.

7. The means of precluding fluid flow, of claim 1, wherein said means in the groove portion comprises an annular O-ring compressedly received therein.

8. Means for precluding flow of corrosive fluid through a space between a pair of confronting wall surfaces comprising: means in one of the wall surfaces defining a groove opening toward the other of the wall surfaces and having bottom and side walls; an elongated seal member of U-shaped transverse cross section disposed in said groove with its leg portions extending toward the groove bottom and its transverse portion extending outwardly of the groove to contact said other of the wall surfaces, said seal member being formed of an inert material; and means in the portion of said groove bounded by the seal member and the groove bottom formed of an elastomer and urging said leg portions apart and into sealing engagement with the groove side walls and urging said transverse portion outwardly and into sealing engagement with said other of said wall surfaces, the sealing engagement of the leg portions with said side walls precluding passage of fluid to within the portion of the groove in which said means is disposed.

References Cited in the file of this patent

UNITED STATES PATENTS

Re. 24,440    Groen  ----------------- Mar. 4, 1958